Feb. 21, 1956 H. A. NORBY 2,735,940
MULTIFREQUENCY KEYED OSCILLATOR CIRCUIT
Filed Jan. 12, 1954
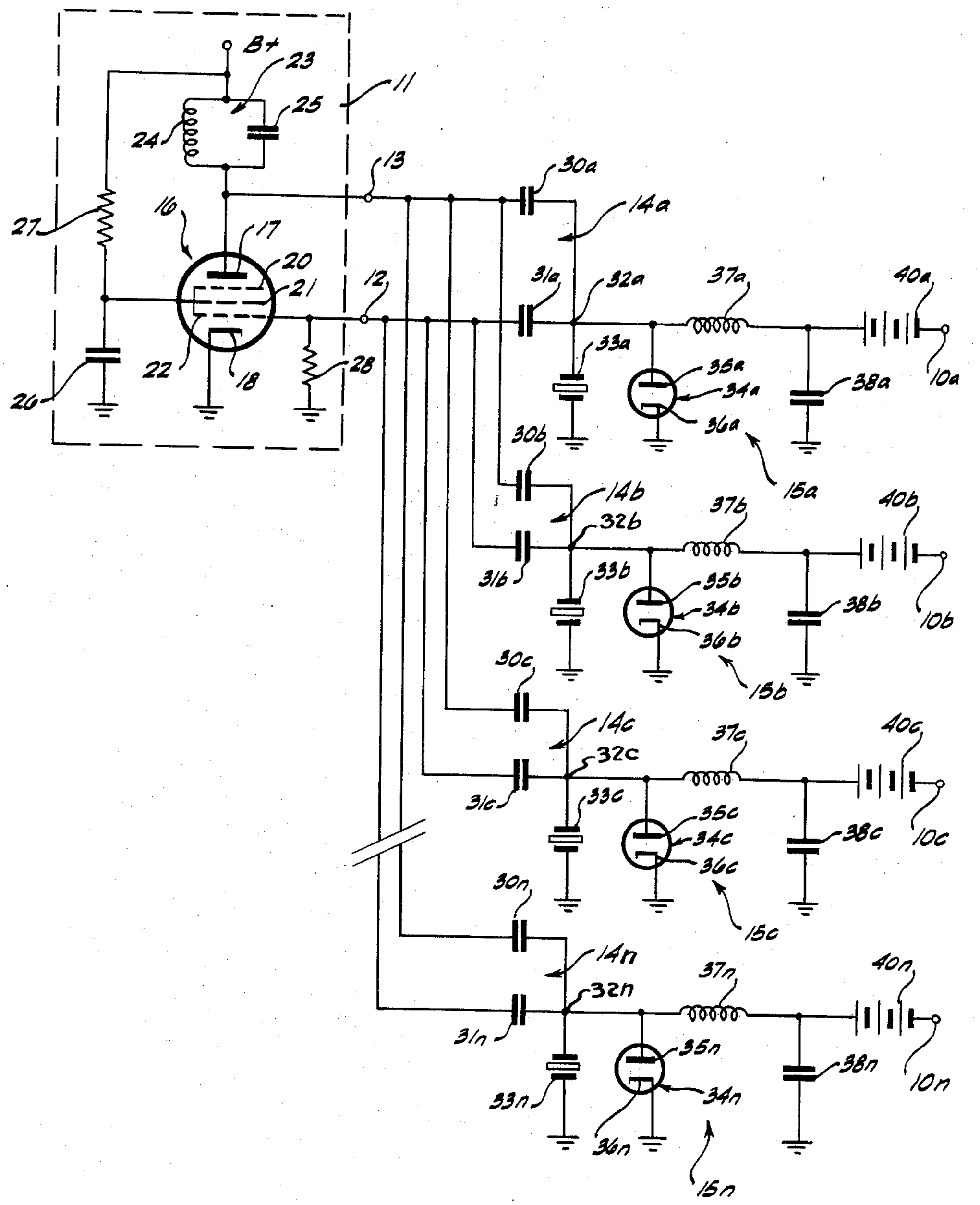
INVENTOR.
HAROLD A. NORBY,
BY
Seymour M. Rosenberg
HIS ATTORNEY.

United States Patent Office 2,735,940

Patented Feb. 21, 1956

2,735,940

MULTIFREQUENCY KEYED OSCILLATOR CIRCUIT

Harold A. Norby, Culver City, Calif., assignor to Hughes Aircraft Company, a corporation of Delaware Application January 12, 1954, Serial No. 403,612

4 Claims. (Cl. 250—36)

The present invention relates to keyed oscillator circuits and more particularly to a multi-frequency keyed oscillator circuit for generating an electrical signal at any one of a number of predetermined frequencies.

Communication systems that transmit pulse coded information require the use of keyed oscillator circuits to generate pulsed carrier signals representative of the selected code and capable of transmission. These pulsed carrier signals may have to be generated continuously and at successively different frequencies depending on the type of modulation employed in the communication system. For example, in a frequency-shift type of communication system, the pulsed carrier signals are normally generated at two predetermined frequencies, the pulsed carrier signals representing the code pulses being generated at one frequency and the pulsed carrier signals representing the intervals between code pulses being generated at the other frequency.

In one type of keyed oscillator circuit found in the prior art, pulsed carrier signals may be generated continuously and at successively different frequencies by continuously applying electrical pulses having correspondingly different voltage amplitudes to a reactance tube shunted across the tank circuit of an oscillator. The reactance tube draws a reactive current that varies with the amplitude of the applied pulses, and which has an effect equivalent to associating a varying capacitive reactance with the tank circuit. Accordingly, the frequency of the pulsed carrier signals generated by the oscillator varies in accordance with the amplitude of the applied pulses.

The principal disadvantage of this prior art keyed oscillator circuit is that inadvertent fluctuations in the amplitude of the applied pulses will produce undesirable variations in the frequency of the corresponding pulsed carrier signals. Consequently, portions of the transmitted information normally generated at one frequency may be generated at another frequency normally reserved for other portions of the transmitted information, with the result that the received information will be unintelligible. Furthermore, if the frequency of the pulsed carrier signals are significantly shifted from their predetermined values, portions of the transmitted information may be rejected by narrow band-pass discriminators included in the communications receiver and the received message will be incomplete.

An additional disadvantage of this type of keyed oscillator circuit is that the sensitivity of the circuit must be reconciled with the predetermined incremental differences in the amplitudes of the applied pulses. In order to generate the pulsed carrier signals at their respective predetermined frequencies, the keyed oscillator circuit must be able to accurately discriminate between the different voltage levels at which the pulses are applied. Consequently, if the predetermined amplitudes of the various applied pulses differ only slightly in magnitude from each other, additional circuits may have to be included in the keyed oscillator circuit to increase its sensitivity. However, the sensitivity of the keyed oscillator circuit is incompatible with the power requirements of the circuit so that any increase in its sensitivity is accompanied by a corresponding increase in its required electrical power.

In the second type of keyed oscillator circuit found in the prior art, pulsed carrier signals may be generated by applying electrical pulses to a keying circuit connected to an oscillator which is normally maintained inoperative. At the beginning of each applied pulse, the keying circuit keys "on" the oscillator to initiate oscillations which are sustained for the duration of the applied pulse by a feedback network in the oscillator. Following each applied pulse, the keying circuit keys "off" the oscillator and the oscillations are damped out.

A basic limitation of this type of keyed oscillator circuit, as found in the prior art, is that it can generate oscillations at only one frequency. Furthermore, the keying circuit prevents a prompt build-up and decay of the oscillations at the beginning and end of each applied pulse, respectively, so that the oscillator tube is not cleared of oscillations following each applied pulse. As a result, the keyed oscillator circuit cannot be adapted to continuously generate pulsed carrier signals at successively different frequencies as may be required by the type of modulation employed in the communications system, as previously mentioned.

In the past, therefore, in order to continuously generate pulsed carrier signals at successively different frequencies, it has been necessary to use a plurality of keyed oscillator circuits of the second type, one for each frequency. With this arrangement, one keyed oscillator circuit would be keyed "on" and connected to the output circuit of the transmitter at the same time that another keyed oscillator circuit was keyed "off" and disconnected from the output circuit of the transmitter. The disadvantage of this arrangement is that it requires a plurality of oscillator tubes as well as equipment for synchronizing the above mentioned "on-off" keying of the keyed oscillator circuits.

The present invention overcomes the above and other disadvantages of the keyed oscillator circuits found in the prior art by providing a multi-frequency keyed oscillator circuit capable of continuously generating pulsed carriers at successively different frequencies. According to the basic concept of this invention, a single oscillator is enabled to generate electrical oscillations at any one of a plurality of predetermined frequencies by providing the oscillator with selectively operable means for regenerating the electrical oscillations at any one of the predetermined frequencies. The continuous generation of pulsed carrier signals at successively different frequencies is made possible by connecting the last named means to additional selectively operable means which, in response to successively applied electrical pulses, render the last named means operable to regenerate oscillations at successively different frequencies.

More particularly, according to an embodiment of this invention, a plurality of selectively operable frequency-selective feedback networks are coupled between the input and output terminals of an amplifier which produces oscillations over a range of frequencies including the plurality of predetermined frequencies. Each feedback network is associated with a different one of the predetermined frequencies and oscillations at any one of the predetermined frequencies may be promptly generated at the output terminal of the amplifier by rendering the associated feedback network operable to regeneratively return a portion of these oscillations to the input terminal of the amplifier.

Each feedback network is connected to a keying circuit which includes a voltage sensitive impedance shunted across the associated feedback network for controlling its operation. The voltage sensitive impedance is normally maintained at a substantially zero impedance value to normally maintain the associated feedback network inoperable. However, in response to a pulse applied to the keying circuit, the voltage sensitive impedance is immediately converted to a high impedance value and the associated feedback network is rendered operable, thereby to promptly build-up the oscillations at the associated frequency.

The most significant advantage of the multi-frequency keyed oscillator circuit of the present invention is that the keying circuits enable oscillations to build-up substantially instantaneously at the beginning of each applied pulse and just as rapidly stop the oscillations at the end of each pulse. As a result, the oscillator tube is immediately cleared of oscillations following each purse and a single oscillator tube can be used to continuously generate pulsed carrier signals at successively different frequencies.

Another advantage of the multi-frequency keyed oscillator circuit of the present invention is that the frequency of the pulsed carrier signals is not dependent on the voltage amplitude of the applied pulses. As a result, inadvertent fluctuations in the amplitude of the applied pulses will not vary the frequency of the corresponding pulsed carrier signals from the desired predetermined frequencies and the likelihood that any portion of the transmitted information will be lost is reduced to a minimum.

It is, therefore, an object of the present invention to provide a multi-frequency keyed oscillator circuit capable of continuously generating pulsed carrier signals at successively different frequencies.

It is a further object of the present invention to provide a multi-frequency keyed oscillator circuit for generating oscillations at successively different frequencies with the use of a single oscillator.

It is another object of the present invention to provide a multi-frequency keyed oscillator circuit in which the oscillations of a single oscillator are selectively regenerated in accordance with the applied keying pulse.

It is an additional object of the present invention to provide a multi-frequency keyed oscillator circuit in which any one of a plurality of non-conducting feedback paths may selectively be rendered conducting for regenerating oscillations produced by a single oscillator at an associated one of a corresponding plurality of frequencies.

It is still another object of the present invention to provide a keyed oscillator circuit having a keying circuit for promptly building up and stopping oscillations generated by the oscillator.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Accordingly, the accompanying figure is a circuit diagram of a multi-frequency keyed oscillator circuit in accordance with the present invention.

Referring now to the drawing, there is shown a multi-frequency keyed oscillator circuit, according to the present invention, which is selectively responsive to a pulse of electrical energy applied to one of a plurality of keying terminals 10*a*—10*n* for generating an oscillatory electrical signal having one of a corresponding plurality of predetermined frequencies $f_a$—$f_m$, respectively. The oscillator circuit basically comprises an amplifier 11 having an input terminal 12 and an output terminal 13, a plurality of selectively operable frequency-selective feedback networks 14*a*—14*n* connected between the input and output terminals of amplifier 11, one network for each keying terminal, and a plurality of keying circuits 15*a*—15*n*, one for each feedback network, each keying circuit being connected between the associated feedback network and keying terminal for controlling the operation of the feedback network.

Amplifier circuit 11 comprises a vacuum tube 16 which is preferably of the pentode type having an anode 17, a cathode 18, a suppressor grid 20, a screen grid 21, and a control grid 22. Anode 17 is connected to output terminal 13, and to one terminal, designated *b*+, of a source of direct-current anode potential, not shown, through a tank circuit 23 comprising an inductor 24 and a capacitor 25 connected in parallel. Cathode 18 and suppressor grid 20 are connected to the other terminal of the anode potential source, designated as ground in the drawing. Screen grid 21 is coupled to ground through a by-pass capacitor 26 and to the B+ terminal through a screen-grid resistor 27. Control grid 22 is connected to input terminal 12 and to a resistor 28 interposed between the control grid and ground.

Feedback networks 14*a*—14*n* are structurally identical with each other so that, for purposes of simplicity, only feedback network 14*a* will be described in detail. As shown in the drawing, feedback network 14*a* comprises a first capacitor 30*a* and a second capacitor 31*a* connected in series between input terminal 12 and output terminal 13, the common junction point between capacitors 30 and 31 being designated 32*a*. Feedback network 14*a* also includes a piezoelectric crystal 33*a* connected between junction point 32*a* and ground and having a resonant frequency $f_a$. Referring again to the structural identity between feedback networks 14*a*—14*n*, it should be mentioned that feedback networks 14*a*—14*n* include a corresponding plurality of crystals 33*a*—33*n* having resonant frequencies $f_a$—$f_n$, respectively. In a sense, each feedback network is analogous to an electric filter having an extremely narrow band-pass characteristic that is different from the band-pass characteristic of the other feedback networks. Stated differently, feedback networks 14*a*—14*n* are frequency selective and each feedback network will pass only the signal generated at output terminal 13 whose frequency corresponds with the resonant frequency of the associated crystal, all other frequencies being substantially rejected.

Keying circuits 15*a*—15*n* are identical with each other in every respect so that, as with the feedback networks, only keying circuit 15*a* will be described in detail. Referring now to the drawing, keying circuit 15*a* comprises a unilateral discharge device, such as a diode 34*a*, connected in shunt with crystal 33*a*, that is, connected between junction point 32*a* and ground. Diode 34*a* has an anode 35*a* connected to the crystal at junction point 32*a* and a cathode 36*a*, connected to ground. Anode 35*a* is also connected to one end of a radio-frequency choke coil 37*a*, the other end of choke coil 37*a* being coupled to ground through a capacitor 38*a* and being connected to the positive terminal of a direct-current biasing source, such as a battery 40*a*. The negative terminal of battery 40*a* is connected to keying terminal 10*a* to which the pulse is applied for "on-off" keying of the oscillator circuit.

It will be recognized that battery 40*a* impresses a potential difference across diode 34*a* that normally maintains the diode current conducting and that this is equivalent to shunting crystal 33*a* with a very low D. C. impedance. For practical purposes, diode 34*a* under this mode of operation may be considered to be a shorted connection between junction point 32*a* and ground. It should be noted, however, that the low D. C. impedance shunted across crystal 33*a* is prevented from being shunted across crystals 33*b*—33*n* by capacitors 30*a*—30*n* and capacitors 31*a*—31*n*. From a D. C. standpoint, these capacitors act as open circuits that effectively isolate crystals 33a—33n from each other. Furthermore, choke coil 37a and capacitor 38a are selected to form a low-pass filter which will pass the relatively low-frequency pulses applied to input terminal 10a but which will effectively prevent the relatively high frequency oscillations generated by the oscillator circuit from passing through to the keying terminals. In other words, choke coil 37a and capacitor 38a provide high frequency isolation between input terminal 10a and the rest of the oscilaltor circuit.

The operation of the multi-frequency keyed oscillator circuit may best be described by first considering the operation of the circuit when a pulse is applied to one keying terminal, such as terminal 10a, and then expanding the description to include the application of pulses to other keying terminals. If it is initially assumed that diodes 34a—34n are in current conducting states, as set forth above, crystals 33a—33n are shunted with very low impedances that sufficiently increase the attenuation of electrical signals through the feedback or regenerative paths, traced from output terminal 13 through feedback networks 14a—14n to input terminal 12, to prevent sustained oscillations at frequencies $f_a$—$f_n$ from being generated at output terminal 13.

Assume now that a negative pulse of electrical energy, greater in voltage amplitude than that of battery 40a, is applied to keying terminal 10a. Anode 35a of diode 34a is driven negative with respect to cathode 36a so that diode 34a is rendered non-conducting for the duration of the applied pulse. As a result, the impedance shunting crystal 33a is converted to a relatively high impedance which remains at a high value because of the isolating effect of capacitors 30a—30n and capacitors 31a—31n, as previously described. The high impedance shunting crystal 33a sufficiently reduces the attenuation of electrical signals through the previously traced feedback path to permit sustained oscillations at frequency $f_a$ to be promptly generated at output terminal 13. The oscillator circuit will continue to generate oscillations at frequency $f_a$ until the termination of the applied pulse at which point diode 34a is restored to a current conducting state and crystal 33a is again shunted by a very low impedance. As a result, the oscillations generated by the oscillator circuit are instantaneously damped out and further signal generation at frequency $f_a$ is precluded until the application of another negative pulse to a keying terminal 10a.

If a negative pulse is subsequently applied to another keying terminal, such as keying terminal 10c, the operation described above will be repeated except that, in this case, the oscillatory signal generated at output terminal 13 by the oscillator circuit will have a frequency $f_c$. As before, these oscillations will continue for the duration of the pulse and will be instantaneously damped out following the termination of the applied pulse.

It is apparent that any arrangement of pulsed carrier signals may be obtained according to the arrangement of the applied pulses. For example, by applying a negative pulse first to one keying terminal and then to another, in sequence, the circuit of the present invention enables the generation of a series of pulsed carrier signals at different frequencies determined by the resonant frequency of the crystals utilized in the circuit. It will also be apparent to those skilled in the art that the same results may be obtained by either applying positive pulses to the cathodes of the various diodes instead of negative pulses to the keying terminals or by reversing the shown diode connections and applying positive pulses to the keying terminals. Thus, by applying a positive pulse first to one cathode and then to another, in sequence, pulsed carrier signals may be generated at different frequencies, as previously discussed.

It should also be mentioned that additional frequencies may be generated by further adding keying circuits and a corresponding number of feedback networks to the oscillator circuit. The only limitation to this additive process is that the resonant frequency of the crystals in the added feedback networks must lie within a range of frequencies determined by the response characteristic of tank circuit 23 and the attenuation characteristics of the feedback networks.

What is claimed as new is:

1. A keyed oscillator circuit, responsive to an applied keying pulse, for generating an electrical signal having one of a plurality of predetermined frequencies, said circuit comprising: an amplifier for producing a plurality of electrical signals having the plurality of predetermined frequencies, respectively; a plurality of frequency-selective feedback networks corresponding, respectively, to the plurality of electrical signals, each feedback network including a resonant circuit tuned to the frequency of the associated electrical signal and being operable to regeneratively return a portion of the associated electrical signal to said amplifier for amplifying said associated signal; and a plurality of keying circuits corresponding, respectively, to said plurality of feedback networks, each of said keying circuits including a rectifier connected in shunt with an associated resonant circuit and being responsive to the applied keying pulse for rendering operable the associated feedback network, thereby to generate said associated electrical signal.

2. The keyed oscillator circuit defined in claim 1 wherein each of said keying circuits includes a diode shunted across the associated frequency-selective feedback network, said diode normally being current conducting and being rendered non-conducting in response to the applied keying pulse to render operable said associated frequency-selective feedback network.

3. A multi-frequency keyed oscillator circuit, responsive to an applied keying pulse, for generating an electrical signal having a selected one of a plurality of predetermined frequencies, said circuit comprising: an oscillator for generating an electrical signal at any one of the predetermined frequencies and including a plurality of selectively operable regenerative feedback networks corresponding to the plurality of predetermined frequencies, respectively, each of said feedback networks including a frequency-selective circuit selectively operable to regenerate said electrical signal at the associated predetermined frequency; and a corresponding plurality of selectively operable voltage sensitive impedances shunting said plurality of frequency-selective circuits, respectively, each of said voltage sensitive impedances normally having a low impedance value for maintaining the associated frequency-selective circuit inoperable and being converted to a high impedance value in response to the applied keying pulse to render operable said associated frequency-selective circuit, thereby to regenerate said electrical signal at the selected one of the predetermined frequencies.

4. A multi-frequency keyed oscillator circuit for generating an electrical signal having a selected one of a plurality of predetermined frequencies, said circuit comprising: an amplifier having output and input terminals for producing at said output terminal a plurality of electrical signals having the plurality of predetermined frequencies, respectively; a plurality of frequency-selective feedback networks corresponding, respectively, to the plurality of electrical signals, each of said feedback networks being coupled between said output and input terminals and including a resonant circuit tuned to the frequency of the associated electrical signal; a plurality of keying circuits corresponding, respectively, to said plurality of feedback networks, each of said keying circuits including a diode shunted across the resonant circuit of the associated feedback network, a source of potential, a low-pass filter connected between said diode and said source for biasing said diode from said source to render said diode conducting; and selectively operable means coupled to said diode for overcoming the biasing of said diode to render said diode non-conducting.

References Cited in the file of this patent

UNITED STATES PATENTS

| | | |
|---|---|---|
| 2,022,067 | Wheeler | Nov. 26, 1935 |

| | | |
|---|---|---|
| 2,486,355 | Bussard | Oct. 25, 1949 |
| 2,553,366 | Fry | May 15, 1951 |

OTHER REFERENCES

Article, "Electronically Tuned Wide Range Oscillator" from Electronics, March 1954, pages 183–186.